C. Brombacher,

Wire Cutter & Shears.

No. 98,843.   Patented Jan. 18. 1870.

WITNESSES.
Chas H Smith
Geo A Walker

Chas Brombacher

United States Patent Office.

CHARLES BROMBACHER, OF TARRYTOWN, NEW YORK.

Letters Patent No. 98,843, dated January 18, 1870.

IMPROVEMENT IN COMBINED WIRE-CUTTER AND SHEARS.

The Schedule referred to in these Letters Patent and making part of the same.

To all whom it may concern:

Be it known that I, CHARLES BROMBACHER, of Tarrytown, in the county of Westchester, and State of New York, have invented and made a new and useful Combined Wire-Cutter and Shears, and the following is declared to be a correct description thereof.

In the manufacture of tin and sheet-metal ware, considerable wire is used to stiffen the edges. It has heretofore been usual for the workman to use the ordinary snips or shears for cutting the wire, so as to save the handling of a separate tool, and also its cost of purchase. This is attended with difficulty, because the wire slides forward between the edges of the snips, until at such a distance from the rivet or fulcrum, that the workman does not have sufficient power in the hand to cut off the wire; besides this, the cutting-edges are notched and injured by the wire.

The nature of my said invention consists in a combined wire-cutter and shears, formed by one or more perforations through the shear-blade, near the joint-pin, and contiguous to the edge of the other blade of the shears, so that wire can be passed through such hole and separated by closing the shears. By this construction the wire is held, and does not slip along upon the edge of the shears while being cut, and the cut is performed at a portion of the blade that is not usually employed in shearing sheet-metal, and the leverage of the handles is sufficient to enable the workman to cut the wire off with ease.

In the drawing—

Figure 1:
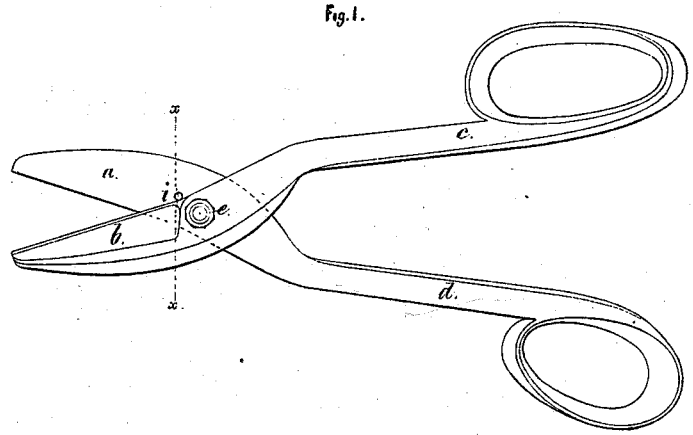
Figure 1 is a side view of the shears or snips and wire-cutter.
Figure 2:
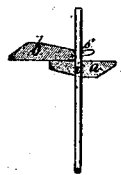
Figure 2 is a section at the line $x\ x$.

$a$ and $b$ are the shear-blades, formed with the respective handles $c\ d$, and $e$ is the fulcrum or joint-pin or screw. These parts are to be of any desired size or shape.

$i$ is the hole in the blade through which the wire to be cut is inserted, as at $g$, so as to be separated by the edge of the blade $b$.

This hole $i$ is to be of any desired size, and located sufficiently near the joint $e$, to give the handles $c\ d$ the necessary leverage.

More than one hole $i$ may be provided, and the size of such hole or holes is to be sufficient for passing as large wire as the shears are adapted to cutting.

I claim, as my invention—

The combined wire-cutter and shears, constructed in the manner specified.

Dated November 30, 1869.

CHAS. BROMBACHER.

Witnesses:
CHAS. H. SMITH,
GEO. T. PINCKNEY.